Figure 1:
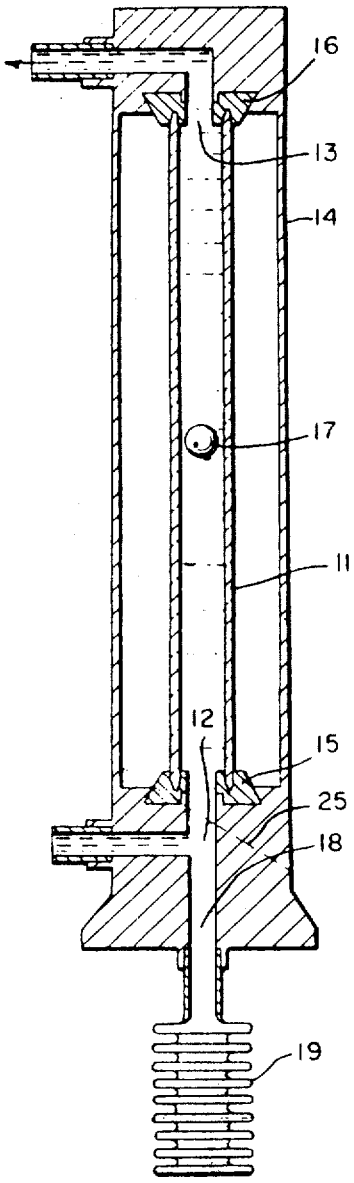
Figure 4:
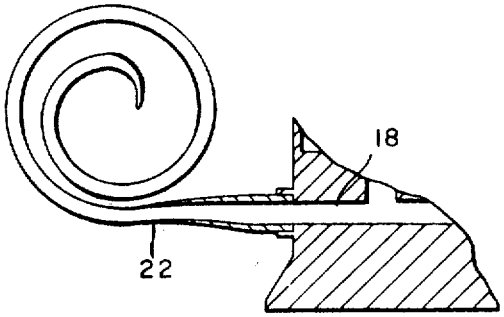
Figure 3:
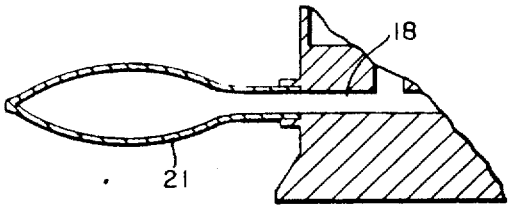
Figure 2:
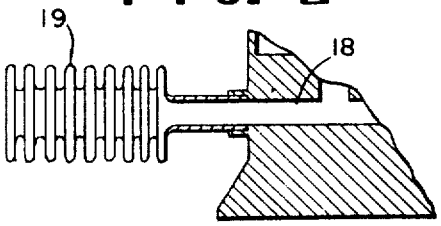

73-861.55 SR

XR T 866,009

Sept. 2, 1969

H. R. FELTON

BUBBLE FREE FLOWMETER

Filed Dec. 31, 1968

DEF. PUB.
788,156

INVENTOR

HERMAN R. FELTON

BY Herbert M. Wolfson

ATTORNEY

T 866,009

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 2, 1969

866 O.G. 23

788,156

BUBBLE FREE FLOWMETER

Herman R. Felton, Wilmington, Del., assignor to E. I. du Pont de Nemours and Company, Wilmington, Del., a corporation of Delaware

Filed Dec. 31, 1968. Published Sept. 2, 1969
**Int. Cl. G01f *1/00***
U.S. Cl. 73—209
1 Sheet Drawing. 7 Pages Specification

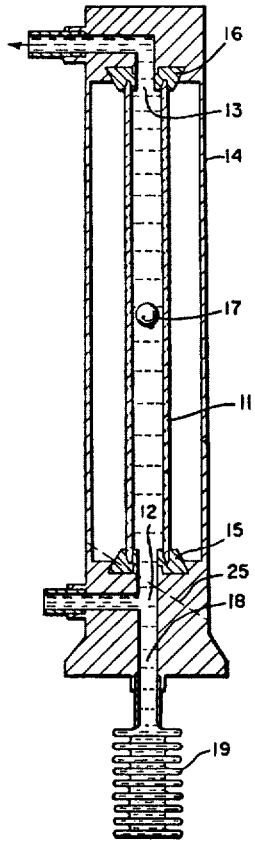

In a rotameter, the improvement of adding to the inlet of the rotameter a deformable chamber with a variable volume large enough so that deformation of the chamber will force enough fluid into the rotameter to cause the indicator in the rotameter to move a sufficient distance to dislodge bubbles adhering to it.